United States Patent Office 2,840,483
Patented June 24, 1958

---

2,840,483
WELL CEMENTING COMPOSITION AND METHOD OF PREPARING AND USING SAME

Bryan E. Morgan, Houston, and George K. Dumbauld, Bellaire, Tex., assignors, by mesne assignments, to Esso Research and Engineering Company, Elizabeth, N. J., a corporation of Delaware No Drawing. Application December 9, 1955
Serial No. 552,223

19 Claims. (Cl. 106—90)

The present invention is directed to a cement composition. More particularly, the invention is directed to a cement composition adapted for use in oil wells and particularly a composition which develops a low strength on setting. In its more specific aspects, the invention is directed to a cement composition for use in oil wells and a method of preparing same.

This application is a continuation-in-part of Serial No. 267,922, filed January 23, 1952, now abandoned, for Bryan E. Morgan and George K. Dumbauld and entitled "Well Cementing Composition and Method of Preparing Same."

The present invention may be described briefly as involving a cement composition adapted for use in well cementing operations which comprises a Portland cement, a liquid hydrocarbon, a water soluble organic dispersing agent and a sufficient amount of water to provide a pumpable slurry when the components of the composition are admixed.

The cement used in our composition is Portland cement as described and specified in A. S. T. M. Designation: C-150. Such Portland cements are well known and readily available on the market.

The liquid hydrocarbon employed in our improved composition should have a viscosity below about 40 centipoises at 100° F., because hydrocarbons of high viscosity are generally heavier and are more difficult to emulsify. Preferably, the viscosity of the hydrocarbon should be below about 10 centipoises at 100° F. The liquid hydrocarbon may be a pure hydrocarbon or it may be a mixture of hydrocarbons. The liquid hydrocarbon may be a crude petroleum or it may be a fraction of crude petroleum, such as gasoline, a kerosene, a gas oil or a diesel oil fraction. It may be desirable to use crude petroleum such as is found in adjacent oil wells in the field where the cementing operation is conducted or under some conditions it may be desirable to use a fuel oil which may be a kerosene or a diesel oil.

The liquid hydrocarbon, as described, may be employed in an amount in the range between about 15 cc. and about 60 cc. per 100 grams of dry cement. A preferred amount is in the range of 20 cc. to 40 cc. per 100 grams of the dry cement.

The water soluble organic dispersing agent may be any water soluble organic dispersing agent selected from a large class of such compounds. The water soluble organic dispersing agent may suitably be selected from the class of compounds possessing calcium tolerance as illustrated by sulfonated compounds, the cation active agents, and the non-ionic agents. As examples of the sulfonated compounds may be mentioned a sulfonated phenol formaldehyde condensation product, such as disclosed in Serial No. 209,510, filed February 5, 1951, now abandoned, in the name of Richard A. Salathiel, the compounds described by Tucker in U. S. 2,141,569, dated December 27, 1938, and the compounds described by Mark in U. S. 2,141,570, dated December 27, 1938. The compounds of the Tucker patent, supra, are soluble salts of the sulfonic acids, such as aromatic sulfonic acids. Tucker discloses that these compounds are formed by causing an aromatic sulfonic acid to react with formaldehyde or its equivalent in a ratio of two moles of sulfonic acid to each mole of aldehyde. Tucker then forms the water soluble salts of these compounds such as the sodium salts. It is also contemplated that the compounds of Mark, supra, may be used such as exemplified by Mark on page 2 of his specification where he sets out the water soluble derivatives of lignin separated by chemical treatment from other constituents present in the wastes of pulp recovery processes. It is intended that the organic dispersing agent will include all of the compounds mentioned by Mark and Tucker, supra. We also contemplate that our organic dispersing agent will include diethylene glycol monolaurate and polyalkylene ether alcohol. While we have given numerous examples of our organic dispersing agent, it will be clear to the skilled workman that many compounds satisfying the requirement of being calcium tolerant may be used in lieu of the specific materials enumerated above.

The organic dispersing agent of the type illustrated may be used in an amount in the range between 0.1% and 7.5% by weight based on the dry cement. A preferred amount is in the range from 0.2% to 5.0% by weight.

In employing the organic dispersing agent, it will generally be desirable to use an amount in the range between 0.1% and 1.0% by weight based on the dry cement when the composition is employed in cementing well casing in the well bore. In these operations, the cement is placed between the well casing and the wall of the well bore to seal the casing in the well bore and these operations are generally termed primary cementing jobs. When employing the composition of the present invention in the so-called permanent well completion method, it is preferred to use an amount in the range between 0.6% and 5.0% by weight.

Ordinarily in wells where the temperature is not excessive, amounts of the organic dispersing agent within the range of 0.1% to 1.0% by weight based on the dry cement may also be used in the permanent well completion operation. Where higher temperatures of the order of about 180° F. to about 280° F. are encountered, it may be desirable to use amounts of organic dispersing agents ranging from preferably about 0.8% to about 5.0% and up to about 7.5% by weight. In the permanent well completion operations, the tubing is arranged in the well only once during the economic life of the well with the tubing being placed in the casing at a level with its lower open end above a plurality of hydrocarbon productive intervals, sands, zones, horizons, strata, formations, and the like from which hydrocarbons, such as oil and gas, are to be obtained. Under those circumstances, a larger amount of the organic dispersing agent may be needed to render the composition fluid and pumpable such that after the perforated casing is sealed with the composition excess slurry may be circulated out by reverse circulation down the annulus between the tubing and casing and up a tubular member positioned in the lower end of the tubing and sealed and secured thereto. A complete description of the permanent well completion method will be found in World Oil, March 1954.

The water should be employed in our improved composition in an amount sufficient to provide a pumpable slurry. An amount in the range between 50% and 120% by weight based on the dry cement will ordinarily be satisfactory with a preferred range from 60% to 80% by weight for primary cementing operations and 80% to 100% by weight for permanent well completion operations.

The preparation of our improved composition may be accomplished in several different ways. One method of forming a slurry in accordance with our composition which is adapted for use in well cementing operations is to make an emulsion of the water and the liquid hydrocarbon and thereafter admix with said emulsion a blend of the Portland cement and a water-soluble organic dispersing agent, the proportions of the water, hydrocarbon, and dispersing agent being in the ranges given above.

Another method of forming our improved composition may be employed and this comprises admixing water, a liquid hydrocarbon and a water soluble organic dispersing agent to form an emulsion, the water soluble organic dispersing agent serving as an emulsifying agent. Portland cement is then admixed with the emulsion to form our composition.

The composition of the present invention may also be formed by blending Portland cement with a water soluble organic dispersing agent in an amount in the range between 0.1% and 7.5% by weight based on the dry cement. The Portland cement and the organic dispersing agent are then admixed with water in an amount in the range between 50% and 120% by weight based on the dry cement to form a slurry. Liquid hydrocarbon is then admixed with the slurry in an amount in the range between 15 cc. and 60 cc. per 100 grams of the dry cement.

It is also desirable in some instances to add to our composition a small amount of a colloidal clay. The amount of the colloidal clay should be small since if large amounts are used it may be necessary either to decrease unduly the amount of the liquid hydrocarbon or to increase unduly the amount of the water included in the composition. The colloidal clay ordinarily should be employed in an amount no greater than 5% by weight based on the dry cement. As examples of suitable colloidal clays are those such as Wyoming bentonite clay, El Paso surface clay, and those clays including the montmorillonites and particularly the sodium montmorillonite. The calcium montmorillonite may be employed and suitable other salts of the montmorillonites may be used. The sodium montmorillonites, such as those encountered in Wyoming bentonite, are included in the preferred type of clay. Clays falling within the purview of our invention are described in the Carman patent, 2,160,788, and the Harth patent, 1,991,637.

When a colloidal clay of the type exemplified above is employed in our composition, the composition may be formed by any of the methods described above in which the clay has been blended with the dry cement prior to forming the slurry or it may be formed in the following manner:

The liquid hydrocarbon or oil component of our composition may be emulsified with water either in the presence or absence of an organic dispersing agent, such as calcium lignin sulfonate. To this emulsion may be added an amount of colloidal clay not exceeding 5% by weight based on the dry cement to be used in the composition. By adding the colloidal clay to the emulsion, the clay is suitably hydrated and exerts a more beneficial effect than if it is added otherwise. To the emulsion containing the colloidal clay then may be added the Portland cement or the blend of Portland cement and organic dispersing agent in an amount sufficient to provide proportions of the composition as have been indicated above.

In all instances of the various methods which may be used in preparing our composition, it is to be understood that vigorous agitation is to be used to obtain intimate admixture of the composition.

Illustrative of slurries embraced by our invention are slurries such as indicated in the following table:

Table I

| Substance in slurry | Slurry 1 | Slurry 2 | Slurry 3 |
|---|---|---|---|
| Cement_____grams__ | 100 | 100 | 100 |
| Calcium lignosulfonate_____cc__ | 0.4 | 0.4 | 5 |
| Water_____cc__ | 60 | 70 | 88 |
| Oil_____do__ | 30 | 20 | 30 |
| Bentonite_____grams__ |  | 4 | 2 |

In order to illustrate the invention further a number of stable oil-in-water type cement emulsion slurries were prepared in accordance with our invention such that the slurries possessed suitable fluidity for pumping into boreholes, such as oil wells. The slurries were formed by three different methods. In the first method water and oil were emulsified by violent agitation, calcium lignosulfonate was added as an organic dispersing agent to dry cement and the resulting mixture was added to the emulsion with stirring. In the second method calcium lignosulfonate as an organic dispersing agent was mixed

Table II

EFFECT OF LIQUID CONTENT WITH WATER-TO-OIL RATIO OF 2:1

| Composition of emulsion cement slurry | | | | Method of mixing [2] | Fluidity, R. P. M. at 400-grams Stormer | Observations on setting [3] | Remarks |
|---|---|---|---|---|---|---|---|
| Portland cement, grams | Calcium lignosulfonate, grams | Water, cc. | Oil,[1] cc. | | | | |
| 100 | 1.0 | 60 | 30 | A | 840 | Set____ | No oil separated. |
| 100 | 1.0 | 70 | 35 | A | 1,090 | __do___ | Do. |

EFFECT OF OIL CONTENT AT CONSTANT WATER-TO-CEMENT RATIO

| 100 | 1.0 | 70 | 26 | A | 1,250 | Set____ | No oil separated. |
| 100 | 1.0 | 70 | 35 | A | 1,090 | __do___ | Do. |
| 100 | 1.0 | 70 | 42 | A | 800 | __do___ | Do. |

EFFECT OF MIXING PROCEDURE AT CONSTANT WATER-TO- AND OIL-TO-CEMENT RATIO

| 100 | 1.0 | 60 | 30 | A | 840 | Set____ | No oil separated. |
| 100 | 1.0 | 60 | 30 | B | 830 | __do___ | Do. |
| 100 | 1.0 | 70 | 35 | A | 1,090 | __do___ | Do. |
| 100 | 1.0 | 70 | 35 | B | 1,220 | __do___ | Do. |
| 100 | 1.0 | 70 | 42 | A | 800 | __do___ | Do. |
| 100 | 1.0 | 70 | 42 | B | 480 | __do___ | Do. |
| 100 | 1.0 | 70 | 42 | C | 1,000 | __do___ | Do. |

[1] Kerosene, specific gravity of 0.80, viscosity of 1.6 centipoises.
[2] A—Emulsion of water and oil prepared by violent agitation. Calcium lignosulfonate mixed with dry cement and resulting mixture placed in emulsion with stirring. B—Calcium lignosulfonate mixed with dry cement and resulting mixture placed in water with stirring. Oil added to above slurry. C—Emulsion of water, oil, and calcium lignosulfonate prepared and dry cement added.
[3] Specimens cured under water 175° F.

with dry cement, the mixture was added to water with stirring, and oil was added to the slurry formed thereby. In the third method an emulsion of water, oil and calcium lignosulfonate was prepared and dry cement added thereto.

The proportions of the ingredients of the several cement slurries, the method of forming the slurries and the inspections and observations of the physical characteristics of the slurries are given in Table II, which illustrates the effects of varying composition and mixing procedures on the properties of the emulsion cement slurries.

It will be noted from the data shown in Table II that in all instances the cement slurries possessed fluidities suitable for pumping and they set without any separation of oil.

Additional slurries were then made up to illustrate the effect of change in oil content and the addition of bentonite on the physical properties of the slurry and of the set cement. These data are presented in Table III which sets out the fluidity, the filtration, thickening time, and strength properties of satisfactory cement compositions prepared in accordance with our invention.

Table III

| Composition of emulsion cement slurry | | | | | Fluidity, R. P. M. at 400-grams Stormer | Filtration,[1] water loss at 100 lbs./sq. in., cc. | | Thickening time [2] | | Tensile strength, lbs./sq. in., cured under water at 120° F. | |
|---|---|---|---|---|---|---|---|---|---|---|---|
| Portland cement, grams | Bentonite, grams | Calcium lignosulfonate, grams | Water, cc. | Oil,[3] cc. | | 3 min. | 30 min. | Hrs. | Mins. | 1 day | 15 days |
| 100 | 0 | 0.4 | 60 | 0 | 1,430 | ---- | ----- | --- | ---- | ----- | ----- |
| 100 | 0 | 0.4 | 60 | 20 | 700 | ---- | ----- | --- | ---- | 103 | 250 |
| 100 | 0 | 0.4 | 60 | 30 | 550 | 53 | 152 | --- | ---- | ----- | ----- |
| 100 | 4 | 0.4 | 70 | 0 | 1,430 | ---- | ----- | --- | ---- | ----- | ----- |
| 100 | 4 | 0.4 | 70 | 20 | 780 | 29 | 102 | --- | ---- | 113 | 240 |
| 100 | 4 | 0.4 | 70 | 30 | 100 | ---- | ----- | --- | ---- | ----- | ----- |
| [4]100 | 0 | 0.4 | 60 | 30 | 670 | 35 | 112 | 1 | 45 | 113 | 197 |
| [4]100 | 4 | 0.4 | 70 | 20 | 970 | 27 | 96 | 2 | 10 | ----- | ----- |

[1] Tested in Standard A. P. I. low-pressure wall building mud tester.
[2] Tested in accordance with Schedule 8, well-simulation casing-cementing job for 14,000 ft. depth, A. P. I. Code 32 (Tentative), Second Edition, June 1950.
[3] Kerosene, specific gravity of 0.80, viscosity of 1.6 centipoises.
[4] Another brand of Portland cement used for these tests.

It will be noted from the data in Table III that an increase in the oil content decreases the fluidity of the slurry. The use of a small amount of bentonite reduces the filtration rate and increases slightly the thickening time of the cement slurry without affecting appreciably the tensile strength of the set cement. It will be noted that sufficient tensile strength was developed both with and without bentonite in the slurry to give a cement of satisfactory strength for oil well cementing operations.

In order to illustrate the superiority of our improved cementing composition over ordinary cement slurries from a standpoint of water loss, additional compositions were prepared and tested, the results of which are presented in Table IV where the effects of the composition and method of oil addition on the properties of the cement emulsion slurries are given.

Table IV
REFERENCE (ORDINARY NEAT CEMENT SLURRY)

| Composition of emulsion cement slurry | | | | | Method of mixing [3] | Fluidity, R. P. M. at 400-grams Stormer | Filtration,[1] water loss at 100 lbs./sq. in. | | | Remarks |
|---|---|---|---|---|---|---|---|---|---|---|
| Portland cement, grams | Bentonite, grams | Calcium lignosulfonate, grams | Water, cc. | Oil,[2] cc. | | | 3 min. | 10 min. | 30 min. | |
| 100 | 0 | 0.0 | 46 | 0 | A | 700 | See remarks. | ---- | ----- | 80 cc. in 1 minute. |

EFFECT OF BENTONITE, CALCIUM LIGNOSULFONATE AND OIL

| 100 | 0 | 0.4 | 70 | 20 | A | 1,500 | 51 | 97 | ----- | No oil in filtrate. |
| 100 | 4 | 0.0 | 70 | 20 | A | 460 | 58 | ---- | ----- | 8 cc. oil in 115 cc. filtrate. |
| 100 | 4 | 0.4 | 70 | 0 | A | 1,500 | 93 | ---- | ----- | |
| 100 | 4 | 0.4 | 70 | 20 | A | 1,000 | 29 | 57 | 103 | No oil in filtrate. |

EFFECT OF CONCENTRATION OF CALCIUM LIGNOSULFONATE

| 100 | 4 | 0.0 | 70 | 20 | A | 460 | 58 | ---- | ----- | 8 cc. oil in 115 cc. filtrate. |
| 100 | 4 | 0.1 | 70 | 20 | A | 880 | 50 | 96 | ----- | 1 cc. oil in 119 cc. filtrate. |
| 100 | 4 | 0.2 | 70 | 20 | A | 920 | 36 | 70 | 128 | No oil in filtrate. |
| 100 | 4 | 0.4 | 70 | 20 | A | 1,000 | 29 | 57 | 103 | Do. |
| 100 | 4 | 0.6 | 70 | 20 | A | 1,250 | 21 | 42 | 74 | Do. |
| 100 | 4 | 1.0 | 70 | 20 | A | 1,300 | 12 | 25 | 46 | Do. |

EFFECT OF METHOD OF ADDITION

| 100 | 4 | 0.0 | 70 | 20 | A | 460 | 58 | ---- | ----- | 8 cc. oil in 115 cc. filtrate. |
| 100 | 4 | 0.0 | 70 | 20 | B | 880 | 92 | ---- | ----- | 8 cc. oil in 137 cc. filtrate. |
| 100 | 4 | 0.1 | 70 | 20 | A | 880 | 50 | 96 | ----- | 1 cc. oil in 119 cc. filtrate. |
| 100 | 4 | 0.1 | 70 | 20 | B | 700 | 43 | 86 | ----- | No oil in filtrate. |
| 100 | 4 | 0.6 | 70 | 20 | A | 1,250 | 21 | 42 | 74 | Do. |
| 100 | 4 | 0.6 | 70 | 20 | C | 550 | 8 | 16 | 31 | Do. |

[1] Tested in Standard A. P. I. low-pressure wall-building mud tester.
[2] Kerosene, specific gravity of 0.80, viscosity of 1.6 centipoises.
[3] A—Bentonite and calcium lignosulfonate mixed with dry cement prior to addition to mix water. Oil added to above slurry. B—Emulsion of water, oil, and calcium lignosulfonate prepared. Bentonite mixed with dry cement and resulting mixture added to the above emulsion. C—Emulsion of water, oil, bentonite, and calcium lignosulfonate prepared. Dry cement then added to this emulsion.

It will be noted from the data in Table IV that the calcium lignosulfonate should be present in at least 0.1% by weight based on the dry cement in order to prevent the presence of oil in the filtrate from the slurry. This applies equally to the slurries prepared by adding the cement to the emulsion of oil and water containing the calcium lignosulfonate. Where the calcium lignosulfonate is admixed with the solids, cement and bentonite, and water followed by oil added to the mixture, the amount of lignosulfonate required to prevent the presence of oil in the filtrate was about 0.2% by weight based on the dry cement.

It should be noted from the data in this table that the filtration rate of a conventional cement slurry now used in oil well cementing operations is 80 cc. in one minute, whereas the filtration rates of slurries of our improved composition range from 16 cc. to 96 cc. in 10 minutes.

Additional slurries were prepared to show the effect of the organic dispersing agent, such as calcium lignosulfonate concentration, on the thickening time of the slurry and the tensile strength of the set cement at different temperatures. These data are presented in Table V.

centration of lignosulfonate to 0.6% or as high as 5% by weight based on the dry cement depending on the use to which the cement slurry is to be employed. As mentioned before, in primary cementing operations and in low temperature wells the lower ranges are desirable, whereas in the permanent well completion operation as high as 7.5% by weight based on the dry cement may be required where the temperatures of the well increase. The rate of strength development of cements increases with increasing temperature and although, as the data show, the calcium lignosulfonate decreases the rate of strength development of our cement compositions, sufficient early strengths are developed by the improved composition containing the larger amounts of the calcium lignosulfonate in the range given to regulate the thickening time at the higher temperatures. It will be noted from the data that the ultimate tensile strength of the slurries having compositions as shown in Table IV is about 200 lbs. per sq. in., which is quite desirable for well cementing purposes. Tensile strengths of approximately 50 to 100 lbs. per sq. in. are considered entirely adequate in this use. These lower tensile strengths are entirely satisfactory in the permanent well completion operations and, in fact, Table V

| Composition of emulsion cement slurry | | | | | Thickening time [1] | | | Tensile strength, lbs./sq. in. | | | |
|---|---|---|---|---|---|---|---|---|---|---|---|
| Portland cement, grams | Bentonite, grams | Calcium lignosulfonate, grams | Water, cc. | Oil,[2] cc. | Schedule No. | Hours | Minutes | Cured under water at 120° F. | | Cured under water at 180° F. | |
| | | | | | | | | 1 day | 7 days | 1 day | 7 days |
| 100 | 0 | 0 | 46 | 0 | ----- | --- | ---- | 362 | 527 | ----- | ----- |
| 100 | 4 | 0.4 | 70 | 20 | 6 | 1 | 50 | ----- | ----- | ----- | ----- |
| 100 | 4 | 0.4 | 70 | 20 | 7 | 1 | 50 | ----- | ----- | ----- | ----- |
| 100 | 4 | 0.4 | 70 | 20 | 8 | 1 | 45 | ----- | ----- | ----- | ----- |
| 100 | 4 | 0.4 | 70 | 20 | 9 | 1 | 30 | ----- | ----- | ----- | ----- |
| 100 | 4 | 0.2 | 70 | 20 | 8 | 1 | 10 | ----- | ----- | ----- | ----- |
| 100 | 4 | 0.4 | 70 | 20 | 8 | 1 | 45 | 108 | 220 | ----- | ----- |
| 100 | 4 | 0.6 | 70 | 20 | 8 | 4 | 30 | 40 | 200 | 143 | ----- |
| 100 | 4 | 0.6 | 70 | 20 | 9 | 2 | 00 | ----- | ----- | ----- | ----- |
| 100 | 4 | 0.8 | 70 | 20 | 9 | 2 | 20 | ----- | ----- | 112 | 170 |
| 100 | 4 | 1.0 | 70 | 20 | ----- | --- | ---- | ----- | ----- | 110 | 175 |

[1] Tested in accordance with well simulation casing cementing jobs as per A. P. I. Code 32 (Tentative), Second Edition, June 1950:

| Schedule No. | Test depth, ft. | Maximum temp., ° F. | Maximum press., lbs./sq. in. |
|---|---|---|---|
| 6 | 10,000 | 144 | 7,484 |
| 7 | 12,000 | 172 | 10,227 |
| 8 | 14,000 | 206 | 13,386 |
| 9 | 16,000 | 248 | 16,144 |

[2] Kerosene, specific gravity of 0.80, viscosity of 1.6 centipoises.

From these data it may be seen that since the thickening time decreases with increasing temperature and since the addition of calcium lignosulfonate increases the thickening time, the thickening time of the cement slurry may be controlled readily by varying the amount of calcium lignosulfonate used.

For low temperature wells, low concentrations in the range from 0.1% to 0.2% calcium lignosulfonate should be sufficient, whereas in deep wells with higher bottom-hole temperatures it may be desirable to raise the conthe initial tensile strength may be lower than approximately 50 p. s. i.

In order to illustrate further the compositions containing larger percentages of the calcium lignosulfonate, compositions were made up containing from 1.1% by weight to 5% by weight of calcium lignosulfonate, the amount of oil and water also being adjusted. These compositions also contained bentonite. The compositions and the characteristics of these compositions are presented in Table V–A.

Table V-A

| Oil emulsion composition (components per 100 gm. cement) | | | | Thickenging time [1] | | 30 min. filtration, API | | Tensile strength, p.s.i. | | |
|---|---|---|---|---|---|---|---|---|---|---|
| Bentonite, grams | Calcium lignosulfonate, grams | Water, cc. | Oil, cc. | Test temp., °F. | Time to 100 poises | Test temp., °F. | Volume filtrate, cc. | Test temp., °F. | 1 day | 7 days |
| 2 | 1.1 | 80 | 20 | 200 | 2 hr., 45 min | ----- | ------- | ----- | ----- | ----- |
| 2 | 1.6 | 80 | 20 | 225 | 1 hr., 45 min | ----- | ------- | ----- | ----- | ----- |
| 2 | 1.2 | 80 | 30 | 200 | 2 hr., 35 min | 200 | 100 | 200 | 114 | 130 |
| 2 | 1.2 | 80 | 30 | ----- | ------- | 75 | 38 | ----- | ----- | ----- |
| 2 | 1.2 | 80 | 30 | ----- | ------- | 185 | 88 | ----- | ----- | ----- |
| 2 | 1.4 | 80 | 30 | 225 | 1 hr., 45 min | ----- | ------- | ----- | ----- | ----- |
| 2 | 2.0 | 80 | 30 | 225 | 2 hr., 30 min | 75 | 37 | ----- | ----- | ----- |
| 2 | 2.2 | 80 | 30 | ----- | ------- | 225 | 95 | ----- | ----- | ----- |
| 2 | 2.2 | 80 | 30 | ----- | ------- | 75 | 22 | ----- | ----- | ----- |
| 2 | 4.0 | 80 | 30 | 250 | 2 hr., 0 min | ----- | ------- | ----- | ----- | ----- |
| 2 | 5.0 | 80 | 30 | 240 | >3 hr., 15 min | ----- | ------- | 240 | 40 | ----- |
| 2 | 5.0 | 80 | 30 | 250 | 2 hr., 15 min | 75 | 10 | ----- | ----- | ----- |
| 2 | 1.5 | 90 | 20 | ----- | ------- | 75 | 85.5 | ----- | ----- | ----- |
| 2 | 2.0 | 90 | 20 | ----- | ------- | 75 | 71 | ----- | ----- | ----- |
| 2 | 1.4 | 90 | 30 | ----- | ------- | ----- | ------- | 225 | 95 | 75 |
| 2 | 1.1 | 90 | 45 | 200 | 2 hr., 10 min | ----- | ------- | ----- | ----- | ----- |
| 2 | 1.2 | 90 | 45 | 200 | >2 hr., 30 min | ----- | ------- | ----- | ----- | ----- |
| 2 | 1.8 | 90 | 45 | ----- | ------- | 75 | 43 | ----- | ----- | ----- |
| 2 | 2.0 | 90 | 45 | 225 | 2 hr., 5 min | 75 | 36 | ----- | ----- | ----- |
| 2 | 2.2 | 90 | 45 | 225 | 2 hr., 30 min | ----- | ------- | ----- | ----- | ----- |

[1] Thickening times are for squeeze cementing simulation test in which final temperature and pressure are reached in approximately 30 minutes.

From these data it may be seen that a composition containing 5 grams of calcium lignosulfonate per 100 grams of cement had a tensile strength of 40 p. s. i. at 240° F. after one day and the thickening time of the slurry was more than 3 hours and 15 minutes.

It may be concluded from these data that these compositions are entirely satisfactory in cementing operations in high temperature wells and especially in permanent well completion methods.

Where the strength of the cement is greater than 300 p. s. i., the strength may be adjusted by adjusting the amount of oil in the composition within the range given.

To illustrate further the amount of liquid hydrocarbon to be used in our composition, the data in Table VI are presented to illustrate a number of cement compositions which were made up to give cement compositions having from 10 cc. to 75 cc. of oil per 100 grams of cement, the amount of water in the composition being adjusted to maintain the fluidity of the slurries at approximately constant value. These slurries were made up by blending the calcium lignosulfonate with the dry cement, adding this mixture to the water with stirring and then adding the oil with stirring. The composition of these slurries, their fluidities, and the tensile strength after curing under water are given in Table VI.

Table VI

| Composition of emulsion cement slurry | | | | Fluidity, R. P. M. at 400-grams stormer | Tensile strength, lbs./sq. in. (cured under water at 120° F.) | |
|---|---|---|---|---|---|---|
| Portland cement, grams | Oil,[1] cc. | Water, cc. | Calcium lignosulfonate, grams | | 1 day | 14 days |
| 100 | 0 | 46 | 0.0 | 940 | 421 | 530 |
| 100 | 10 | 50 | 0.4 | 940 | 205 | 347 |
| 100 | 20 | 60 | 0.4 | 910 | 163 | 268 |
| 100 | 30 | 70 | 0.4 | 910 | 92 | 172 |
| 100 | 40 | 80 | 0.4 | 940 | 57 | 127 |
| 100 | 50 | 90 | 0.4 | 940 | 35 | 85 |
| 100 | 60 | 100 | 0.4 | 1,000 | 25 | [2] 68 |
| 100 | 75 | 110 | 0.4 | 940 | 25 | [2] 47 |

[1] Diesel oil, specific gravity of 0.835, viscosity of 3.0 centipoises.
[2] 7-day results.

Referring to the data in Table VI, the 14-day strength of the set cement represents, for all practical purposes, the ultimate and final strength of the composition. While as little as 10 cc. of oil per 100 grams of cement caused a definite reduction in strength of the cement composition, it is to be noted that an amount above 10 cc. per 100 grams of cement is required to provide a composition having an ultimate strength less than 300 lbs. per sq. in. Thus it will be seen that a composition having an oil content of approximately 15 cc. per 100 grams of cement will attain an ultimate strength near 300 lbs. per sq. in. Oliphant and Farris, AIME Transactions, vol. 170 (1947), page 225, have set out the advantages of low strength cement having tensile strength below 300 lbs. per sq. in. for use in oil well cementing operations.

The data given in the foregoing examples illustrate that our composition should contain between 15 cc. and 60 cc. of liquid hydrocarbon per 100 grams of cement, between 50 cc. and 120 cc. of water per 100 grams of cement, and an organic dispersing agent in the range between 0.1 gram and 7.5 grams per 100 grams of cement to give a cement composition when set having a tensile strength of 300 lbs. per sq. in. or less. Actually, it is preferred to use liquid hydrocarbon in an amount in the range between 20 cc. and 40 cc. per 100 grams of cement, water in an amount in the range from 60 cc. and 100 cc. per 100 grams of cement, and an organic dispersing agent in the range between 0.2 gram and 5.0 grams per 100 grams of cement.

In order to illustrate the effectiveness of other water soluble organic dispersing agents such as the product described in Serial No. 209,510, supra, slurries were made up with the sodium salt of sulfonated phenol formaldehyde condensation product in compositions in accordance with the present invention. The compositions of these slurries and the results of the tests thereon are presented in Table VII.

*Table VII*

| Composition of emulsion cement slurry | | | | | Fluidity, R. P. M. at 400 grams Stormer | Filtration,[2] water loss at 100 lbs/sq. in., cc. | | Thickening[3] time | | Tensile strength, lbs./sq. in., cured under water at 180° F. | |
|---|---|---|---|---|---|---|---|---|---|---|---|
| Portland cement grams | Sodium salt of sulfonated phenol formaldehyde, grams | Bentonite, grams | Water, cc. | Oil,[1] cc. | | 3 min. | 30 min. | Hrs. | Min. | 1 day | 28 days |
| 100 | 0.15 | 0 | 60 | 30 | 830 | ---- | ----- | --- | ---- | 152 | 175 |
| 100 | 0.50 | 0 | 60 | 30 | 1,200 | ---- | ----- | 1 | 50 | ---- | ---- |
| 100 | 0.50 | 4 | 70 | 20 | 770 | 39 | [4]113 | --- | ---- | 147 | ---- |

[1] Kerosene, 0.8 specific gravity.
[2] Tested in Standard API low-pressure wall building mud tester.
[3] Tested in accordance with Schedule 8, well-simulation casing-cementing job for 14,000 ft. depth, API Code 32 (Tentative), Second Edition, June, 1950.
[4] Filtrate contained 3 cc. of oil.

As indicated by the results in Table VII, the sodium salt of sulfonated phenol formaldehyde condensation product is effective in preparation of oil emulsion cements of our invention. In preparing the slurries, the tests of which are presented in Table VII, the sodium salt of the sulfonated phenol formaldehyde product was mixed with the dry cement and water was added to the mixture while stirring. Oil was then added with continued stirring to produce the final slurry. In the instance where bentonite was used the bentonite was mixed with the sodium salt of the sulfonated phenol formaldehyde condensation product and the dry cement.

The data in Table VII show that the sodium salt of sulfontaed phenol formaldehyde product is effective as an organic dispersing agent and compositions are produced having the desirable properties sought for. Larger amounts of the sodium salt and the like of sulfonated phenol formaldehyde product within the range given for the organic dispersing agent may be used.

In order to show that slurries containing crude oil in accordance with our invention may be produced having the desirable properties, slurries were made up in which crude oil was used in one instance as compared to kerosene in another instance. Both slurries contained bentonite, calcium lignosulfonate and water, in addition to the kerosene in one instance and the crude oil in another instance. The properties of these slurries are shown in Table VIII, where the results are compared.

*Table VIII*

| Composition of emulsion cement slurry | | | | | Fluidity, R. P. M. at 400 grams Stormer | Thickening[1] time | |
|---|---|---|---|---|---|---|---|
| Portland cement, grams | Calcium lignosulfonate, grams | Bentonite, grams | Water, cc. | Oil, cc. | | Hrs. | Mins. |
| 100 | 0.4 | 4 | 70 | [2]20 | 1,320 | 2 | 00 |
| 100 | 0.4 | 4 | 70 | [3]20 | 1,200 | 2 | 00 |

[1] Tested in accordance with Schedule 6, well-simulation casing-cementing job for 10,000 ft. depth, API Code 32 (Tentative), Second Edition, June, 1950.
[2] Kerosene specific gravity of 0.80, viscosity of 1.6 centipoises.
[3] Crude oil, specific gravity of 0.85, viscosity of 5.0 centipoises.

It will be noted from the data in Table VIII that the emulsion cement slurry prepared with crude oil is very similar in properties to that prepared from kerosene. These two slurries were prepared by emulsifying the oil, water and calcium lignin sulfonate together and then adding the dry mixture of bentonite and cement to the emulsion with stirring.

It will be seen that our improved composition has numerous advantages over conventional cement. Our improved composition has low density, low tensile strength, improved settling characteristics, low water losses and also by virtue of the oil content has lubricating properties. The density of our emulsion slurries, exemplified by the numerous examples, ranges from about 11 to approximately 12½ lbs. per gallon as compared to 16 for neat cement slurries. The low density of our emulsion slurries is important since the density of the conventional neat Portland cement slurry is higher than desirable for many cementing operations. Furthermore, the neat slurry of the prior art does not possess sufficient gel strength to suspend all the cement particles and settling may occur before the mass sets. The neat slurry of the prior art has a very high filtration and the set mass possesses greater strength than desirable. In our compositions, the density of the slurries is sufficient to allow the slurry to be used in well cementing operations more efficiently than heretofore. Furthermore, we are able to produce low density slurries having a sufficiently high tensile strength to be suitable for oil well cementing operations. It will be apparent to the skilled workman that we may vary the strength of our cement by suitably adjusting the concentration of oil in the slurry. The tensile strength of the set cements from our composition is usually lower than 200 lbs. per sq. in. as compared to 600 lbs. or higher for neat cement, which makes our composition quite desirable for oil well cementing operations. Oliphant and Farris, supra, pointed out the advantages of such low strength cements. In the prior art cements, such as neat cement slurries, the solid particles settle appreciably and this settling may result in a faulty cement job. On the other hand, cement slurries, such as ours, show no tendency for the solids to settle on standing. As illustrated by the data, our compositions are outstanding from the standpoint of low water loss. Cement slurries in accordance with the present invention show filtration rates of approximately 100 cc. in 30 minutes as compared to approximately 80 cc. in one minute for the prior art compositions when the two types of slurries are tested at 100 lbs. per sq. in. in the standard API low-pressure wall-building mud tester. As pointed out before, our composition has lubricating properties. It is believed that the use of emulsion cements will lubricate the well casing and permit it to be rotated readily during placement of cement.

The compositions of the present invention achieve a beneficial result only by the presence of the several components therein. The presence of the liquid hydrocarbon or oil results in the cement composition having a low density, a low filtration rate, and a low strength. The organic dispersing agent, such as calcium lignosulfonate, prevents separation of oil from the slurry and increases the thickening time. At high temperatures the organic dispersing agent provides a sufficient pumpability for the slurry such that, in the permanent well completion operations, the excess slurry may be circulated out without plugging the well casing. The water and the cement are used in proportions to provide a slurry of the desirable fluidity and a set mass of the desired strength. Thus each of the components of our composition cooperates to produce a desired result.

The presence of a colloidal clay is desirable but not absolutely necessary. Small amounts of colloidal clay, such as bentonite, aids in stabilizing the composition and reduces the filtration rate. A word of caution as to the use of bentonite in our improved composition is necessary in that the amount of bentonite should not exceed about 5% by weight of the dry cement since larger amounts of bentonite would affect the tensile strength of the set cement because more water would be required to render the composition sufficiently fluid to be pumpable.

In employing the composition of the present invention the slurry may be pumped down into the well which is to be cemented and/or sealed; for example, in the permanent well completion method referred to supra, the slurry may be formed at the well head and then pumped down the tubing and through a tubular member, sealed and secured in the lower open end of the tubing, to the region where perforations have been made in the casing and which are to be sealed. After the filter cake or slurry of cement has deposited in and sealed the perforations, the excess cement slurry is circulated out by reverse circulation of washing fluid such as water, oil and the like down the annulus between the tubing and casing and up the tubular member and tubing.

In primary cementing operation, the cement may be pumped down the casing and up the annulus between the casing and wall of the borehole, as in conventional procedures to seal the casing in the well.

The nature and objects of the present invention having been completely described and illustrated, what we wish to claim as new and useful and to secure by Letters Patent is:

1. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, a calcium tolerant water soluble salt of lignin sulfonic acid in an amount in the range between 0.1% and 7.5% by weight based on the dry cement, and water in an amount in the range between 50% and 120% by weight based on the dry cement.

2. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at a 100° F. less than 40 centipoises in an amount in the range between 15 cc. and 60 cc. per 100 grams of the dry cement, a calcium tolerant water soluble salt of lignin sulfonic acid in an amount in the range between 0.1% and 7.5% by weight based on the dry cement, water in an amount in the range between 50% and 120% by weight based on the dry cement sufficient to provide a pumpable slurry, and a colloidal clay in a stabilizing and filtration reducing amount less than 5% by weight based on the dry cement.

3. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, a calcium tolerant water soluble organic dispersing agent selected from the class consisting of the water soluble salts of lignin sulfonic acid, sulfonated phenolformaldehyde condensation product, aromatic sulfonic acids, and the water soluble salts of lignin and its derivatives separated by chemical treatment from other constituents present in the wastes of pulp recovery processes in an amount in the range between 0.1% and 7.5% by weight based on the dry cement, and water in an amount in the range between 50% and 120% by weight based on the dry cement sufficient to provide a pumpable slurry.

4. A cement composition in accordance with claim 3 in which the hydrocarbon is crude pertoleum.

5. A cement composition in accordance with claim 3 in which the hydrocarbon is a kerosene.

6. A cement composition in accordance with claim 3 in which the hydrocarbon is a Diesel oil.

7. A cement composition in accordance with claim 3 in which the hydrocadbon is a gasoline.

8. A composition in accordance with claim 3 in which the hydrocarbon is a gas oil.

9. The method of cementing a well which comprises admixing water and a liquid hydrocarbon selected from the class consisting of pure hydrocarbons and hydrocarbon mixtures having a viscosity at 100° F. less than 40 centipoises to form an emulsion, admixing a Portland cement with a calcium tolerant water soluble organic dispersing agent selected from the class consisting of the water soluble salts of lignin sulfonic acid, sulfonated phenolformaldehyde condensation product, aromatic sulfonic acids, and the water soluble salts of lignin and its derivatives separated by chemical treatment from other constituents present in the wastes of pulp recovery processes in an amount in the range between 0.1% and 7.5% by weight based on the dry cement to form a blend and admixing the blend of Portland cement and water soluble dispersing agent with the emulsion to form a pumpable slurry consisting of said ingredients, said slurry having a density in the range from about 11 to approximately 12½ lbs. per gallon and having a tensile strength when set below 300 lbs. per sq. in. said water and hydrocarbon being used, respectively, in an amount in the range between 50 cc. and 120 cc. and in the range between 15 cc. and 60 cc. per 100 grams of the dry cement, then pumping said slurry into the well, contacting the wall of said well with said slurry to form a filter cake thereon, and then removing excess slurry from the well.

10. The method of cementing a well which comprises admixing water, a liquid hydrocarbon selected from the class consisting of pure hydrocarbons and hydrocarbon mixtures having a viscosity at 100° F. less than 40 centipoises, and a water soluble organic dispersing agent selected from the class consisting of calcium tolerant water soluble salts of lignin sulfonic acid, sulfonated phenolformaldehyde condensation product, and the water soluble salts of lignin and its derivatives separated by chemical treatment from other constituents present in the wastes of pulp recovery processes to form an emulsion, and then admixing a Portland cement with the emulsion to form a pumpable slurry consisting of said ingredients, said slurry having a density in the range from about 11 to approximately 12½ lbs. per gallon and having a tensile strength when set below 300 lbs. per sq. in., said water, hydrocarbon and dispersing agent being used, respectively, in an amount, based on 100 grams of the dry cement, in the range between 50 cc. and 120 cc., in the range between 15 cc. and 60 cc. and in the range between 0.1 gram and 7.5 grams, then pumping said slurry into the well, contacting the wall of said well with said slurry to form a filter cake thereon, and then removing excess slurry from the well.

11. The method of cementing a well which comprises admixing with Portland cement a water soluble organic dispersing agent selected from the class consisting of the water soluble salts of lignin sulfonic acid, sulfonated phenolformaldehyde condensation product, aromatic sulfonic acid, and the calcium tolerant water soluble salts of lignin and its derivatives separated by chemical treatment from other constituents present in the wastes of pulp recovery processes in an amount in the range between 0.1% and 7.5% by weight based on the dry cement to form a blend, admixing the blend of Portland cement and organic dispersing agent with water in an amount in the range between 50% and 120% by weight based on the dry cement to form a slurry, and admixing a liquid hydrocarbon selected from the class consisting of pure hydrocarbons and hydrocarbon mixtures having a viscosity at 100° F. less than 40 centipoises with said slurry in an amount in the range between 15 cc. and 60 cc. per 100 grams of the dry cement to provide a pumpable slurry consisting of said ingredients, said slurry having a density in the range from about 11 to approximately 12½ lbs. per gallon and having a tensile strength when set below 300 lbs. per sq. in., then pumping said admixed slurry into the well, contacting the wall of said well with said slurry to form a filter cake thereon, and then removing excess slurry from the well.

12. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, a calcium tolerant water soluble salt of sulfonated phenolformaldehyde condensation product in an amount in the range between 0.1 and 7.5% by weight based on the dry cement and water in an amount in the range between 50% and 120% by weight based on the dry cement.

13. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, a calcium tolerant water soluble salt of sulfonated phenolformaldehyde condensation product in an amount in the range between 0.1% and 7.5% by weight based on the dry cement, water in an amount in the range between 50% and 120% by weight based on the dry cement sufficient to provide a pumpable slurry, and a colloidal clay in a stabilizing and filtration reducing amount less than 5% by weight based on the dry cement.

14. The method of cementing a well which comprises admixing with a Portland cement a liquid hydrocarbon selected from the class consisting of pure hydrocarbons and hydrocarbon mixtures having a viscosity at 100° F. less than 40 centipoises in an amount in the range from 15 cc. and 60 cc. per 100 grams of the dry cement, a water soluble organic dispersing agent selected from the class consisting of the calcium tolerant water soluble salts of lignin sulfonic acid, sulfonated phenolformaldehyde condensation product, aromatic sulfonic acid and the water soluble salts of lignin and its derivatives separated by chemical treatment from other constituents present in the wastes of pulp recovery processes in an amount in the range between 0.1% and 7.5% by weight based on the dry cement, and water in a sufficient amount in the range between 50% and 120% by weight based on the dry cement to provide a pumpable slurry consisting of said ingredients, said slurry having a density in the range from about 11 to approximately 12½ lbs. per gallon and having a tensile strength when set below 300 lbs. per sq. in., then pumping said slurry into the well, contacting the wall of said well with said slurry to form a filter cake thereon, and then removing excess slurry from the well.

15. A method in accordance with claim 14 in which the organic dispersing agent is a sodium salt of sulfonated phenolformaldehyde condensation product.

16. A method in accordance with claim 14 in which the organic dispersing agent is a calcium salt of lignin sulfonic acid.

17. A method in accordance with claim 14 in which a colloidal clay in a stabilizing and filtration reducing amount less than 5% by weight based on the dry cement is admixed with the Portland cement.

18. The method in accordance with claim 14 in which the amount of organic dispersing agent is in the range from 0.1% to 1.0% by weight based on the dry cement.

19. A composition in accordance with claim 3 in which the amount of organic dispersing agent is in the range between 0.1% and 1.0% by weight based on the dry cement.

References Cited in the file of this patent

UNITED STATES PATENTS

| | | |
|---|---|---|
| 2,285,302 | Patterson | June 2, 1942 |
| 2,582,459 | Salathiel | Jan. 15, 1952 |
| 2,593,492 | Scripture | Apr. 22, 1952 |
| 2,646,360 | Lea | July 21, 1953 |